United States Patent
Heinen

(10) Patent No.: US 11,352,134 B2
(45) Date of Patent: Jun. 7, 2022

(54) FLIGHT VEHICLE WITH DRONE AND LIFT-PRODUCING PROTRUSION

(71) Applicant: Raytheon Company, Waltham, MA (US)

(72) Inventor: Gregory W. Heinen, Lowell, MA (US)

(73) Assignee: Raytheon Company, Waltham, MA (US)

( * ) Notice: Subject to any disclaimer, the term of this patent is extended or adjusted under 35 U.S.C. 154(b) by 914 days.

(21) Appl. No.: 15/863,018

(22) Filed: Jan. 5, 2018

(65) Prior Publication Data
US 2019/0210723 A1  Jul. 11, 2019

(51) Int. Cl.
*B64C 39/02* (2006.01)
*H01Q 1/34* (2006.01)
(Continued)

(52) U.S. Cl.
CPC .............. *B64C 39/024* (2013.01); *B64B 1/34* (2013.01); *B64B 1/44* (2013.01); *B64B 1/54* (2013.01);
(Continued)

(58) Field of Classification Search
CPC .... B64B 1/44; B64B 1/70; B64B 1/34; B64B 1/54; B64B 2201/00; H01Q 1/082;
(Continued)

(56) References Cited

U.S. PATENT DOCUMENTS

| | | | | |
|---|---|---|---|---|
| 2,407,634 A | * | 9/1946 | Du Pont | B64D 3/00 244/3 |
| 3,260,480 A | * | 7/1966 | Ash | B64B 1/62 244/31 |

(Continued)

FOREIGN PATENT DOCUMENTS

| CN | 203 921 198 U | 11/2014 |
|---|---|---|
| CN | 106 167 091 A | 11/2016 |

(Continued)

OTHER PUBLICATIONS

International Search Report and Written Opinion for corresponding International Search Report PCT/US2018/051688 dated Dec. 10, 2018.

(Continued)

*Primary Examiner* — Tye William Abell
(74) *Attorney, Agent, or Firm* — Renner, Otto, Boisselle & Sklar, LLP

(57) ABSTRACT

A flight vehicle includes a drone with a pair of shaped protrusions mechanically coupled to the drone. One of the shapes is a hollow lift-producing shape, such as being a balloon filed with a lighter-than-air gas, and the other of the shapes is below the drone. The shape below the drone may be a hollow shape that does not produce lift, for example being a balloon filled with air. The shapes may be similar in size and shape, so as to provide similar drag characteristics. The shapes may be opposite ends of a support, such as a stick, rod, or other (relatively) slender structure. The vehicle includes a payload, such as radar calibration equipment or an antenna. The drone may be used to counteract wind forces on the flight vehicle, and/or to otherwise position the flight vehicle.

17 Claims, 4 Drawing Sheets

(51) Int. Cl.
| | |
|---|---|
| *B64B 1/44* | (2006.01) |
| *B64B 1/70* | (2006.01) |
| *B64B 1/34* | (2006.01) |
| *H01Q 1/22* | (2006.01) |
| *H01Q 1/08* | (2006.01) |
| *G01S 7/40* | (2006.01) |
| *H01Q 1/28* | (2006.01) |
| *B64B 1/54* | (2006.01) |

(52) U.S. Cl.
CPC ............. *B64B 1/70* (2013.01); *G01S 7/4052* (2013.01); *H01Q 1/082* (2013.01); *H01Q 1/2291* (2013.01); *H01Q 1/28* (2013.01); *H01Q 1/34* (2013.01); *B64B 2201/00* (2013.01); *B64C 2201/022* (2013.01); *B64C 2201/027* (2013.01); *B64C 2201/101* (2013.01); *B64C 2201/108* (2013.01); *B64C 2201/12* (2013.01); *G01S 7/4004* (2013.01); *G01S 7/4082* (2021.05)

(58) Field of Classification Search
CPC ................ H01Q 1/28; B64C 2201/022; B64C 2201/027; B64C 2201/101; B64C 2201/108; G01S 7/4004
See application file for complete search history.

(56) References Cited

U.S. PATENT DOCUMENTS

| | | | | | |
|---|---|---|---|---|---|
| 3,623,107 | A | * | 11/1971 | Holdren, III | H01Q 1/082 343/912 |
| 4,695,012 | A | * | 9/1987 | Lindenbaum | B64B 1/24 244/26 |
| 6,220,543 | B1 | * | 4/2001 | Uskolovsky | B64C 37/02 244/16 |
| 7,036,768 | B2 | * | 5/2006 | Bundo | B64B 1/22 244/6 |
| 8,544,788 | B1 | * | 10/2013 | Capper | B64B 1/28 244/33 |
| 8,668,161 | B2 | * | 3/2014 | Heppe | B64B 1/54 244/2 |
| 8,678,309 | B2 | * | 3/2014 | Heppe | B64B 1/50 244/30 |
| 8,931,727 | B2 | * | 1/2015 | Engblom | G05D 1/104 244/2 |
| 9,611,025 | B2 | * | 4/2017 | Heppe | B64B 1/00 |
| 11,242,840 | B2 | * | 2/2022 | Sia | F03D 7/0204 |
| 2006/0000945 | A1 | * | 1/2006 | Voss | B64B 1/60 244/97 |
| 2014/0191893 | A1 | | 7/2014 | Fox et al. | |
| 2015/0291269 | A1 | * | 10/2015 | Goelet | B64B 1/58 244/30 |
| 2017/0233054 | A1 | * | 8/2017 | MacCallum | B64B 1/70 244/31 |
| 2018/0304981 | A1 | * | 10/2018 | Piette | B64B 1/22 |
| 2018/0319476 | A1 | * | 11/2018 | Araujo | B64C 39/024 |
| 2019/0030447 | A1 | * | 1/2019 | Zima | A63H 27/10 |

FOREIGN PATENT DOCUMENTS

| | | | |
|---|---|---|---|
| CN | 106167091 A | * 11/2016 | |
| DE | 100 35 844 A1 | 8/2001 | |
| WO | 2014/207732 A1 | 12/2014 | |
| WO | 2016/185074 A1 | 11/2016 | |
| WO | WO-2016185074 A1 | * 11/2016 | ........... B64C 39/024 |
| WO | 2017/075678 A1 | 5/2017 | |
| WO | 2017/127746 A1 | 7/2017 | |

OTHER PUBLICATIONS

Atlas, "Radar Calibration—Some Simple Approaches", American Meteorological Society, vol. 83, No. 9, Sep. 2002, pp. 1313-1316.
Boyer et al., "UAV-Based Calibration for Polarimetric Phased Array Radar", [online: http://www.caps.ou.edu/reu/reu16/finalpapers/Boyer-Paper.pdf], retrieved on Jan. 24, 2018, pp. 1-7.
Juang, "That's no balloon, it's a drone! Halo takes to the skies at latest trend in UAVs", [online: https://www.cnbc.com/2017/05/06/thats-no-balloon-its-a-drone-halo-takes-to-the-skies-as-latst-trend-in-UAVs], retrieved on Nov. 27, 2017, p. 1 of 4.
Lavars, "An inflatable flying camera for the drone-averse", Apr. 2016, [online: https://newatlas.com/skye-aerotain-flying-camera/4906/], retrieved on Nov. 27, 2017, pp. 1-5.
Li et al., "Radar Signatures of Small Consumer Drones", 2016 AP-S/USNC-URSI IEEE, Puerto Rico, 2016, pp. 1-23.
"The Luneberg Lens Principle", [online: http://radar-reflector.comThe Luneberg principle Passive radar reflector for aerial target], retrieved Nov. 27, 2017, pp. 1-2.
Russhenberg et al., "Deliverable D2.3: Radar calibration and standardization concepts", in Proc., ACTRIS, 2015, pp. 1-7.
Suh et al., "Drone-Based External Calibration of a Fully Synchronized Ku-Band Heterodyne FMCW Radar", IEEE Transactions on Instrumentation and Measurement, 2017, vol. 66, Issue 8, pp. 2189-2197.
Williams et al., "End-to-End Calibration of Nexrad Differential Reflectivity with Metal Spheres", in Proc. 36th Conference Radar Meteorological, Sep. 2013.

* cited by examiner

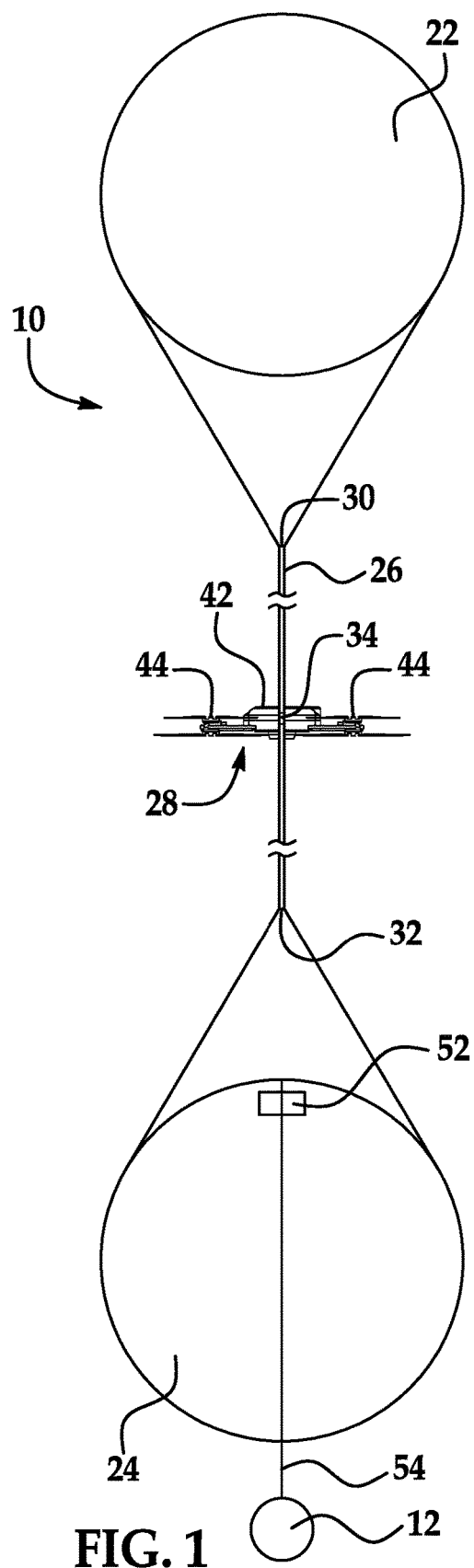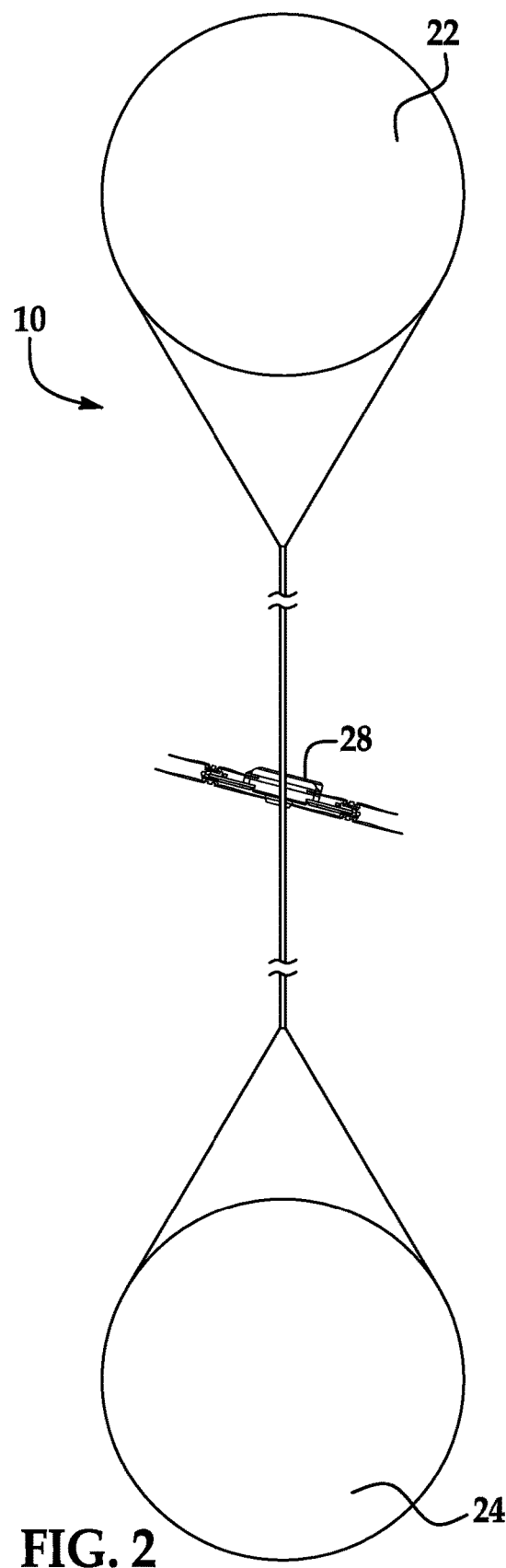
FIG. 1
FIG. 2

FLIGHT VEHICLE WITH DRONE AND LIFT-PRODUCING PROTRUSION

FIELD OF THE INVENTION

The invention is in the field of flight vehicles, in particular for flight vehicle that are able to maintain flight in one place for long periods of time.

DESCRIPTION OF THE RELATED ART

Radars require periodic calibration for system changes such as transmit and receive exciter outages or other changes to arrays and radar systems. A convenient calibration sphere can be balloon lofted but is often at the whims of weather, and launch intercept probability based on beam pointing restrictions and limited dwell. It is far better to have a maneuverable radar calibration sphere, and one that can be deployed to desired altitudes and locations. It is also desirable to lower the sphere to desired separation from a drone. Drones alone provide limited dwell, especially after climbing to altitude and position. The lowering of the sphere and recovery also reduce the dwell.

Other situations call for payloads/equipment to be kept aloft for an extended period of time. Improvements in the efficiency and performance of such systems would in general be desirable.

SUMMARY OF THE INVENTION

A flight vehicle includes a pair of protrusions, one of which provides buoyant lift.

A negatively-buoyant flight vehicle includes a lighter-than-air protrusion, as well as a drone to provide additional lift.

A flight vehicle include rotors to provide a lift assist, and variable thrust, which may be vectored, to oppose wind forces, to keep the flight vehicle in a desired orientation, and/or to steer and/or move the flight vehicle.

A flight vehicle includes top and bottom protrusions at opposite ends of a relative slender support (more slender than the protrusions). The protrusions may have similar shapes, or otherwise may have similar drag characteristics. The top protrusion may be more buoyant than the bottom protrusion. For example, the top protrusion may be a lighter-than-air balloon, and the bottom protrusion may be heavier than air.

According to an aspect of the invention, a flight vehicle includes: a multirotor drone; a first protrusion above and mechanically connected to the drone; and a second protrusion below and mechanically connected to the drone; wherein the first protrusion is a lift-producing protrusion.

According to an embodiment of any paragraph(s) of this summary, the flight vehicle further includes a payload mechanically coupled to the drone and/or the second protrusion.

According to an embodiment of any paragraph(s) of this summary, the flight vehicle further includes a payload below the drone.

According to an embodiment of any paragraph(s) of this summary, the payload is below the second protrusion.

According to an embodiment of any paragraph(s) of this summary, the payload is on an extendible tether.

According to an embodiment of any paragraph(s) of this summary, the payload includes radar calibration equipment.

According to an embodiment of any paragraph(s) of this summary, the payload includes an antenna.

According to an embodiment of any paragraph(s) of this summary, the flight vehicle further includes a shaft mechanically coupling the first protrusion and the second protrusion, at opposite respective ends of the shaft.

According to an embodiment of any paragraph(s) of this summary, the drone is coupled to the shaft between the ends of the shaft.

According to an embodiment of any paragraph(s) of this summary, the drone is coupled to the shaft at a joint, allowing the drone to tilt relative to the shaft.

According to an embodiment of any paragraph(s) of this summary, the joint is a one degree-of-freedom joint.

According to an embodiment of any paragraph(s) of this summary, the joint is a two degrees-of-freedom joint.

According to an embodiment of any paragraph(s) of this summary, the drone is fixedly attached to the shaft.

According to an embodiment of any paragraph(s) of this summary, the flight vehicle further includes a drift brake that provides thrust orthogonal to lift provided by the drone.

According to an embodiment of any paragraph(s) of this summary, the protrusions have the same shape.

According to an embodiment of any paragraph(s) of this summary, the first protrusion is a first balloon.

According to an embodiment of any paragraph(s) of this summary, the second protrusion is a second balloon.

According to an embodiment of any paragraph(s) of this summary, the balloons are spherical.

According to an embodiment of any paragraph(s) of this summary, the first balloon is filled with a lighter-than-air gas, and the second balloon is filled with air.

According to another aspect of the invention, a method of operating a negatively-buoyant flight vehicle includes the steps of: providing lift from a top protrusion of the flight vehicle that is lighter than air; and providing additional lift from propellers of a drone that is below the top protrusion; wherein the top protrusion provides more lift than the drone.

According to yet another aspect of the invention, a method of calibrating a radar system includes the steps of: locating a flight vehicle that includes radar calibration equipment attached by a tether to a remainder of the flight vehicle, wherein the locating includes placing the radar calibration equipment in a main radar beam of the radar system, and the remainder of the flight vehicle outside of the main radar beam; and calibrating the radar system using the radar calibration equipment.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The annexed drawings, which are not necessarily to scale, show various aspects of the invention.

FIG. 1 is a side view of a flight vehicle in accordance with an embodiment of the invention.

FIG. 2 is a side view of the flight vehicle of FIG. 1, encountering moderate wind forces.

DETAILED DESCRIPTION

Figure 3:
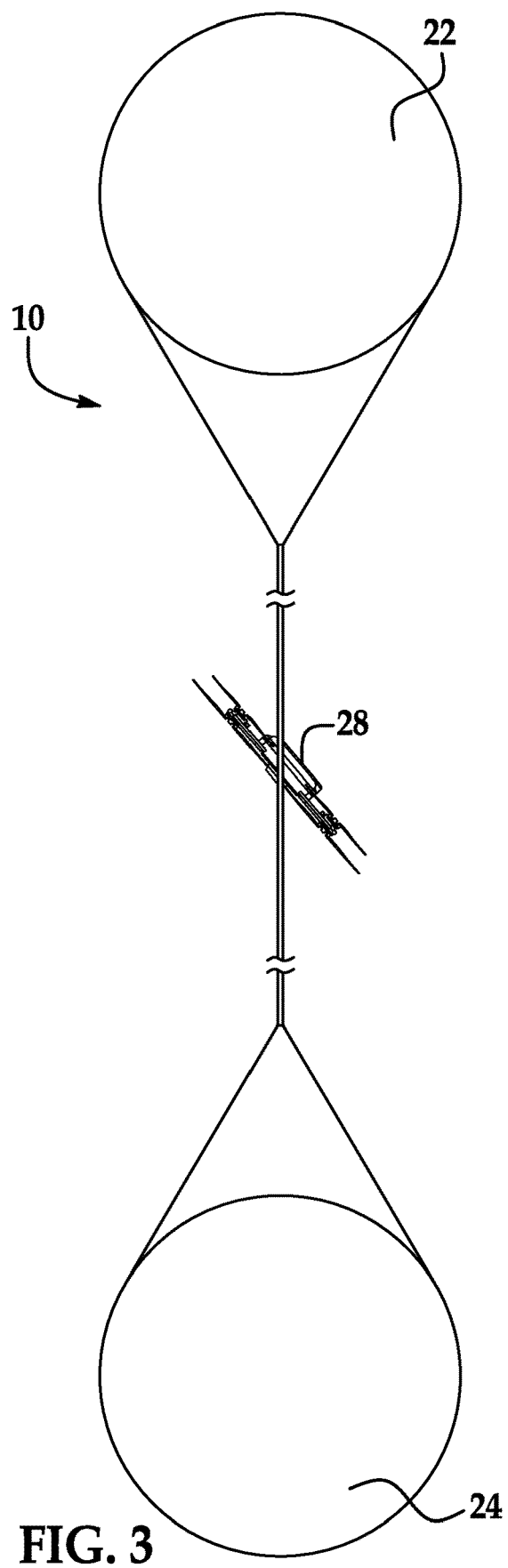
FIG. 3 is a side view of the flight vehicle of FIG. 1, encountering high wind forces.

A flight vehicle includes a drone with a pair of shaped protrusions mechanically coupled to the drone. One of the shapes is a hollow lift-producing shape, such as being a balloon filed with a lighter-than-air gas, and the other of the shapes is below the drone. The shape below the drone may be a hollow shape that does not produce lift, for example being a balloon filled with air. The shapes may be similar in size and shape, so as to provide similar drag characteristics. The shapes may be opposite ends of a support, such as a stick, rod, or other (relatively) slender structure. The vehicle includes a payload, such as radar calibration equipment or an antenna. The drone may be used to counteract wind forces on the flight vehicle, and/or to otherwise position the flight vehicle. The lift-producing hollow shape and the drone may be used in combination in positioning the flight vehicle. The drone may be coupled to a central section of the support, with the drone able to tilt relative to the support. The vehicle may have the advantage of a long flight time with low power requirements.

FIG. 1 shows a flight vehicle 10 that may be used to keep a payload 12 aloft. The payload 12 in the illustrated embodiment is a radar calibration sphere, a structure that reflects radar, and is used in calibrating radar systems. Alternatively may be other radar calibration equipment, or other equipment, such as an antenna.

The flight vehicle 10 includes a pair of shaped protrusions 22 and 24 on opposite ends of a support 26. The support 26 is a relatively slender structure, for example a rod or hollow tube that is narrower (smaller diameter, for example) than the shaped protrusions 22 and 24. A drone 28 is mechanically coupled to the support 26, between the protrusions 22 and 24.

The support 26 is usually oriented vertically, or more vertical than horizontal, with the protrusion 22 being at a top end 30 of the support 26, and the protrusion 24 at a bottom end 32 of the support 26. The top protrusion 22 is lift producing, for example being hollow and filled with a lighter-than-air gas. The top protrusion 22 may be a helium-filled balloon, to give a specific example, and may be spherical or may have another suitable shape. The connections between the support 26 and the protrusions 22 and 24 may be rigid, or may allow for some relative movement.

The top protrusion 22 may provide the bulk of the lift for maintaining the flight vehicle 10 aloft. Other parts of the flight vehicle 10 provide stabilization, maintaining a desired orientation of the flight vehicle 10, preventing and/or compensating for wind drift, and/or fine tuning the positioning of the flight vehicle 10.

The bottom protrusion 24 is used to balance wind drag about the support 26, providing at least roughly the same drag at the top and bottom. The bottom protrusion 24 may have the same shape (or about the same shape) as that of the top protrusion 22. More broadly, the bottom protrusion 24 may have a shape that has similar drag characteristics to that of the top protrusion 22.

The bottom protrusion 24 is heavier than the top support 22, so as to bias the orientation of the flight vehicle 10 as shown in FIG. 1, with the top protrusion 22 at a higher altitude than the bottom protrusion 22. The bottom protrusion 24 may be heavier than air, for example being an air-filled balloon of the same configuration as the top protrusion. Alternatively the bottom protrusion 24 may be another heavier-than-air hollow or solid shape. As a further alternative the bottom protrusion 24 may be lighter than air, but providing less buoyancy (lift) than the top support 22, such that the air vehicle 10 is biased with top protrusion 22 higher than the bottom protrusion 24.

The drone 28 may be mechanically coupled to the support 26 so as to allow the drone 28 to tilt relative to the support 26, with the connection being made at a joint 34, such as a universal joint. For example the drone 28 may tilt at around 22.5 degrees in typical operating environment, with the tilt varying up to 40 degrees (as a non-limiting example), based on the wind forces to be counteracted (and/or on other factors). The joint 34 may allow movement of the drone 28 relative to the support 26 with one or two degrees of freedom. The tilting of the drone 28 allows vectoring of the thrust provided by the drone 28, to allow movement of the flight vehicle 10, or to counteract forces on the flight vehicle 10, such as wind forces.

The drone 28 may have a central body 42, which is where the joint 34 attaches to the drone 28, and rotors 44 that surround the body 42. There may be four of the rotors 44, at corners of the body 42. The rotors 44 may be variable pitch rotors, with the amount of lift provided by each of the rotors 44 varied by varying the pitch of the propellers of the rotors 44. Alternatively, the rotors may be variable-speed rotors, with the lift varied by changing the turning speed of the rotors.

The drone 28 acts as a movement damper, to damp movements of the flight vehicle, such as tilting of the flight vehicle 10 or translations of the flight vehicle 10. In addition the flight vehicle 10 may naturally have a slightly negative buoyancy, with the drone 28 required to provide some lift to maintain the flight vehicle 10 airborne. This provides the ability to assure recovery of the flight vehicle 10, by having the flight vehicle 10 descend if the drone 28 loses power or otherwise becomes inoperative.

The tilting of the drone 28 may be servo controlled, with a suitable controller used to damp out oscillations of the flight vehicle 10. Such a controller may take any of a wide variety of known suitable forms.

The joint 34 may be located close to the center of gravity of the flight vehicle 10. This allows operation of the drone 28 without placing much in the way of a torque on the flight vehicle 10. The location of the joint 34 may be at or close to the center of the support 26, equidistant between the protrusions 22 and 24, for example.

The payload 12 may be stowed within a hollow in the bottom protrusion 24 when the payload 12 is not in use. A reel 52 of a suitable material, such as a cable or line 54, may be used in lowering the payload 12 for use, for example to get the payload 12 a suitable distance from the rest of the flight vehicle for use, with a motor for example controlling the spooling and unspooling of the line on the reel 52. Using the example of the radar calibration sphere shown as the payload 12, it may be desirable to have the sphere an appreciable distance away from the rest of the flight vehicle 10 during the calibration process, so as to minimize the effect of the other parts of the flight vehicle 10 on the calibration process. Thus is may be desirable to allow the calibration sphere to be extended out on the cable 54 a distance of 30.5 m (100 feet) to 61 m (200 feet) (or other suitable distances).

The distance between the payload 12 and the rest of the flight vehicle 10 may be advantageous in radar calibration. For example, in the calibration of vertically-pointing cloud radars it may be possible to put the radar calibration equipment inside the main beam of the radar, while the rest of the flight vehicle 10 is outside of the radar beam. For beams that are sufficiently narrow and not vertical, such that the beam main lobe has sufficient vertical deviation, it is possible to drop the calibration sphere (a radar calibration equipment payload) by a tether (such as the cable or line 54) into the beam lobe, or probe the beam side lobes. The ability to place the calibration sphere in a desired XYZ position and extensively further move the Z (vertical) position via an extending tether provides a degree of freedom not achieved by current art. This is especially true for higher reaches and for extended periods of endurance afforded by the buoyant properties of the top balloon (the top protrusion 22) that extends the mission time with limited battery power to maintain station.

A wide variety of materials may be used for the protrusions 22 and 24, and the support 26. For a radar calibration target, it is advantageous for the support 26 and the protrusions 22 and 24 to not reflect radar. For example the protrusions 22 and 24 may be made of non-reflective polyester film, such as that sold under the tradename MYLAR, and the support 26 also may be made of a material that does not reflect radar, such as by being a tube made of glass and an aramid fiber, such as that sold under the tradename KEVLAR.

The flight vehicle 10 and its components may have any of a variety of suitable sizes. In one non-limiting embodiment, the top and bottom protrusions have diameters of 1.3 m (4.3 feet), and the support 26 may have a length of 2.4-3.7 meters (8-12 feet). The drone 28 may have a diagonal length of 1.2-1.3 meters (48-52 inches). The flight vehicle 10 may have a mass of up to 5.4 kg (12 pounds). All of these values are non-limiting examples, and a wide variety of other suitable values are possible.

FIGS. 2 and 3 show tilting of the drone 28 to counteract wind forces. In FIG. 2 the wind speed is a moderate amount, counteracted with a moderate tilting of the drone 28. FIG. 3 depicts a situation with a greater wind speed, required a larger tilt angle for the drone 28 in order to counteract the wind forces that would otherwise translate the flight vehicle 10. Since the protrusions 22 and 24 have similar drag characteristics, the wind does not put a torque on the flight vehicle 10 to urge the flight vehicle 10 out of its vertical orientation.

The flight vehicle 10 provides a myriad of advantages. It is aerodynamically stable and negatively buoyant, yet it relies upon a passive mechanism (the lighter-than-air top protrusion 22) for most of its lift. By relying on a drone only for secondary lifting (and for some steering forces, such as for counteracting wind forces) flight endurance is improved, and less power is required to keep the flight vehicle 10 aloft (relative to systems that rely upon a drone for the main lifting force). The use of the drone 28 to provide vectored thrust allows the flight vehicle to be launched in a range of wind field conditions. Relative to balloon systems that are presently used in radar calibration, it allows for more reliable positioning of radar calibration equipment, such as where it can be reached by radar beams of systems to be calibrated. This may also tie in with reducing the time for calibration and overall improving calibration efficiency.

Figure 4:
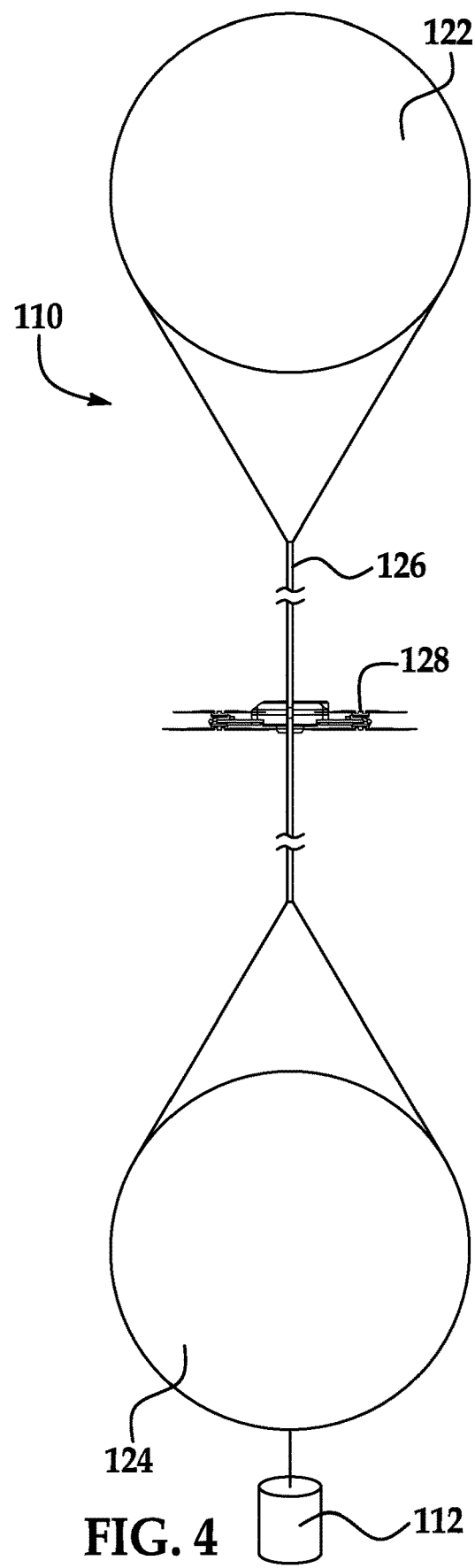
FIG. 4 is a side view of a flight vehicle according to an alternate embodiment of the invention.

FIG. 4 shows an alternative, a flight vehicle 110 with an antenna 112 as the payload. The antenna 112 may be a cylindrical structure, for example being usable as an antenna for broadcasting signals. In one embodiment the antenna 112 may be used to broadcast Wi-Fi or 5G signals, to give non-limiting examples.

Other parts of the flight vehicle 110 may be similar to those of the flight vehicle 10 (FIG. 1). The flight vehicle 110 has protrusions 122 and 124 at opposite ends of a support 126, with a drone 128 mounted to the support 126 (such as at a joint). The antenna 112 may be attached to the bottom protrusion 124, and may have a fixed location or may be deployable from the rest of the flight vehicle 110.

Figure 5:
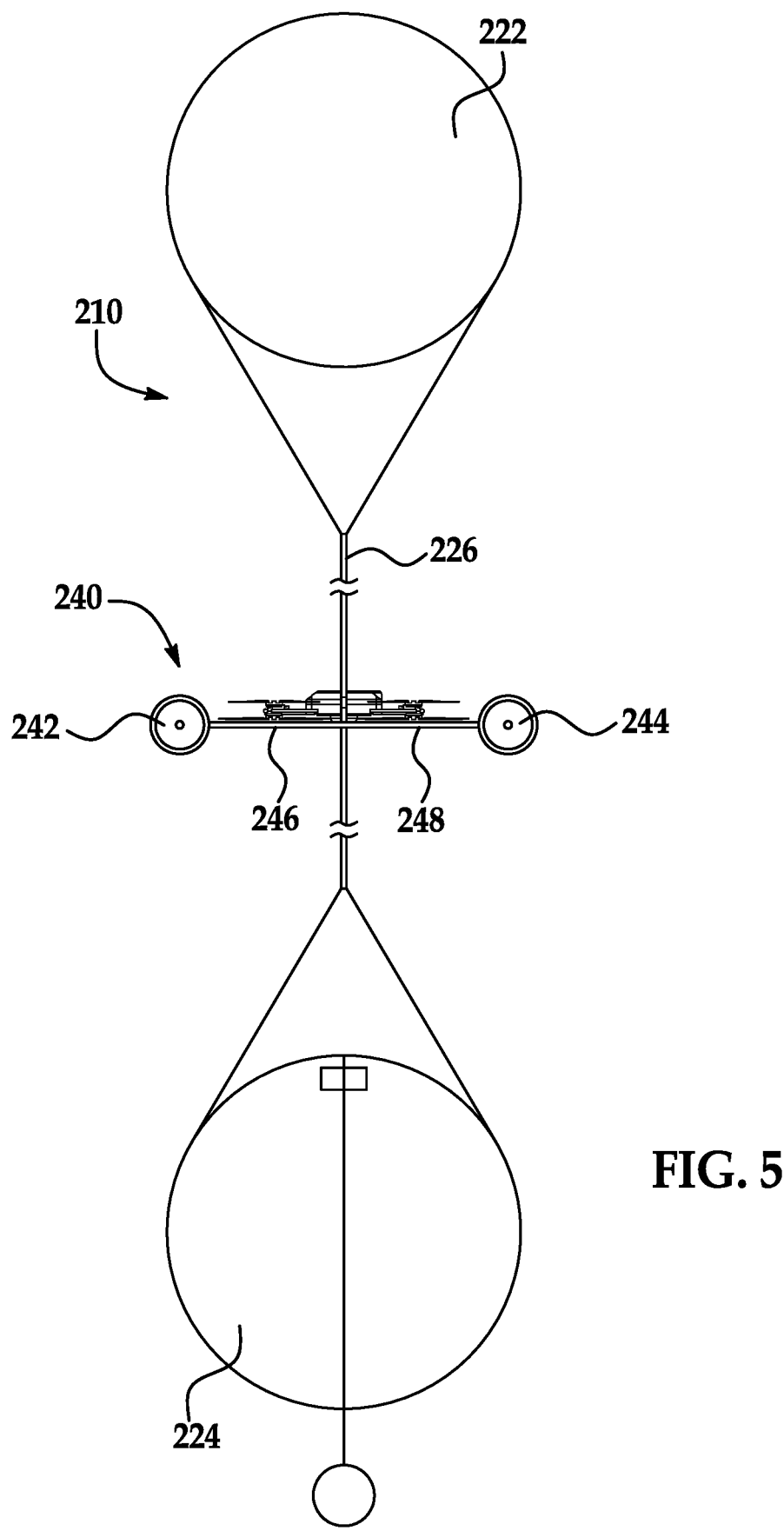
FIG. 5 is a first side view of a flight vehicle according to another alternate embodiment of the invention.
Figure 6:
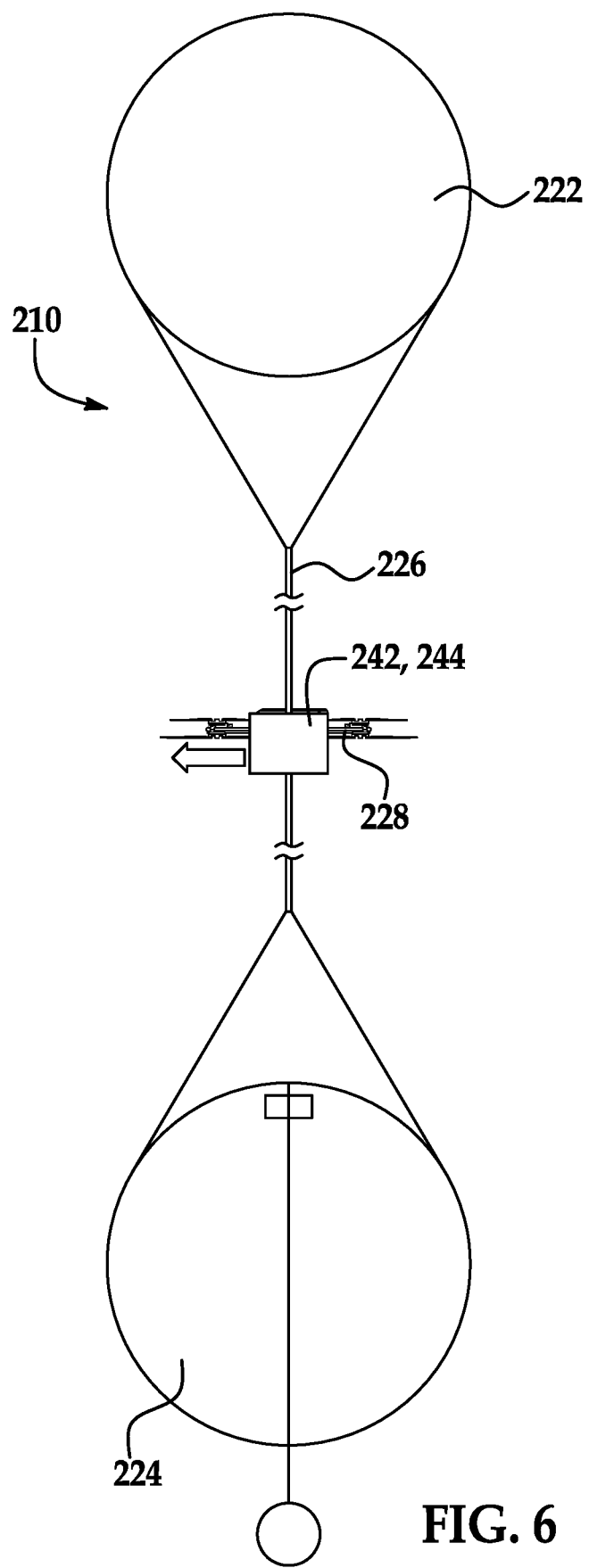
FIG. 6 is a second side of the flight vehicle of FIG. 5.

FIGS. 5 and 6 show an alternative embodiment, a flight vehicle 210 that relies on a drift brake. The flight vehicle 210, as with the other flight vehicles described above, has protrusions 222 and 224 at opposite ends of a support 226, with a drone 228 mounted to the support 226. The flight vehicle 210 has a payload 212, such as radar calibration equipment or an antenna, which may be coupled to or incorporated within or as a part of, any part of the flight vehicle 210, for example being deployable from the bottom protrusion 224.

Unlike for the flight vehicle 10 (FIG. 1) and the flight vehicle 110 (FIG. 4), the drone 228 does not tilt relative to the support 226 and other parts of the flight vehicle 210. Instead the drone 228 has a fixed orientation, for instance supplying lift only. Instead a drift brake 240 is used for movement and opposing wind forces. The drift brake 240 includes at least two rotors 242 and 244 mounted on respective booms 246 and 248, at about the same location along axial extent (length) of the support 226 as the drone 228. The rotors 242 and 244 have encapsulated propellers that provide thrust when turned. The rotors 242 and 244 may have their propellers turned at varying speeds (and/or at varying pitches) to turn the flight vehicle 210 about the axis of the support 226, and/or to translate the flight vehicle 210 and/or counteract wind forces on the flight vehicle 210. The rotors 242 and 244 provide thrust orthogonal to the lift provided by the drone 228.

Figure 7:
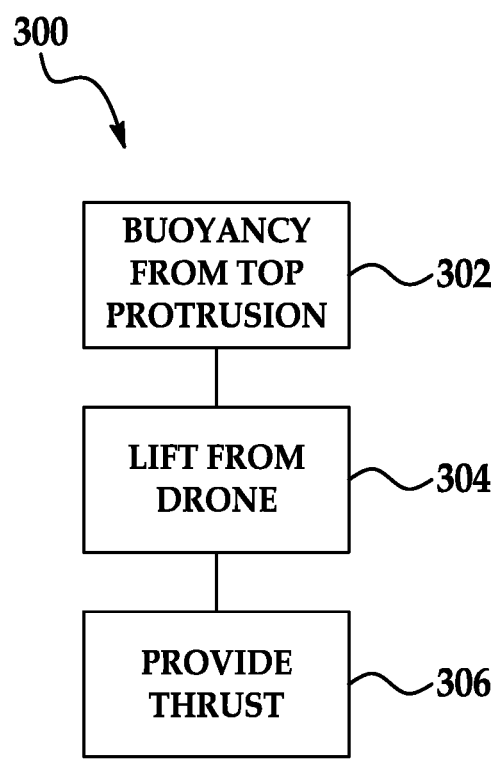
FIG. 7 is a high-level flow chart of a method according to an embodiment of the invention.

FIG. 7 shows a high-level flow chart of a method 300 of operating a flight vehicle, such as those described above. In step 302 a buoyant top protrusion provides most of the lift to keep the negatively-buoyant flight vehicle aloft. In step 304 the drone provides additional lift. In step 306 rotors (either on the drone or separate from the drone, such as being on a drift brake) provide thrust to counteract wind forces and/or to steer/move the flight vehicle. These steps may be performed in any order, and may overlap in time.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A flight vehicle comprising:
   a multirotor drone;
   a first protrusion above and mechanically connected to the drone;
   a second protrusion below and mechanically connected to the drone;
   a shaft mechanically coupling the first protrusion and the second protrusion, at opposite respective ends of the shaft;
   wherein the first protrusion is a lift-producing protrusion;
   wherein the drone is coupled to the shaft between the ends of the shaft;
   wherein the first protrusion and the second protrusion have the same shape and provide substantially the same drag; and
   wherein the drone is coupled to the shaft at a joint, allowing the drone to tilt relative to the shaft.

2. The flight vehicle of claim 1, further comprising a payload mechanically coupled to the drone and/or the second protrusion.

3. The flight vehicle of claim 1, wherein the joint is a one degree-of-freedom joint.

4. The flight vehicle of claim 1, wherein the joint is a two degrees-of-freedom joint.

5. The flight vehicle of claim 1, wherein the shaft is a rod.

6. The flight vehicle of claim 1, wherein connections between the shaft, and the first protrusion and the second protrusion, are rigid.

7. The flight vehicle of claim 1, wherein the shaft is a linear, straight shaft that extends along an axis of the shaft.

8. The flight vehicle of claim 1, wherein the first protrusion is a first balloon.

9. The flight vehicle of claim 8, wherein the second protrusion is a second balloon.

10. The flight vehicle of claim 9, wherein the first balloon is filled with a lighter-than-air gas, and the second balloon is filled with air.

11. The flight vehicle of claim 1, further comprising a payload below the drone.

12. The flight vehicle of claim 11, wherein the payload is below the second protrusion.

13. The flight vehicle of claim 11, wherein the payload is on an extendible tether.

14. The flight vehicle of claim 11, wherein the payload includes radar calibration equipment.

15. The flight vehicle of claim 11, wherein the payload includes an antenna.

16. A method of operating a negatively-buoyant flight vehicle, the method comprising:
    providing lift from a top protrusion of the flight vehicle that is lighter than air;
    providing additional lift from propellers of a drone that is below the top protrusion;
    wherein the top protrusion provides more lift than the drone;
    providing a second protrusion below and mechanically connected to the drone;
    providing a shaft mechanically coupling the top protrusion and the second protrusion, at opposite respective ends of the shaft;
    wherein the drone is coupled to the shaft between the ends of the shaft;
    wherein the top protrusion and the second protrusion have the same shape and provide substantially the same drag; and
    wherein the drone is coupled to the shaft at a joint, allowing the drone to tilt relative to the shaft.

17. A flight vehicle comprising:
    a multirotor drone;
    a first protrusion above and mechanically connected to the drone;
    a second protrusion below and mechanically connected to the drone;
    a shaft mechanically coupling the first protrusion and the second protrusion, at opposite respective ends of the shaft;
    wherein the first protrusion is a lift-producing protrusion;
    wherein the drone is coupled to the shaft between the ends of the shaft;
    wherein the first protrusion and the second protrusion have the same shape and provide substantially the same drag;
    wherein the drone is fixedly attached to the shaft; and
    further comprising a drift brake that provides thrust orthogonal to lift provided by the drone.

* * * * *